United States Patent [19]

Schlautmann

[11] Patent Number: 4,828,471

[45] Date of Patent: May 9, 1989

[54] TIRE CURING MOLD

[76] Inventor: Heinrich Schlautmann, Leuchte 92, 6000 Frankfurt 60, Fed. Rep. of Germany

[21] Appl. No.: 97,878

[22] Filed: Sep. 16, 1987

[30] Foreign Application Priority Data

Sep. 17, 1986 [DE] Fed. Rep. of Germany ........ 3631533

[51] Int. Cl.$^4$ ............................................. B29D 29/00
[52] U.S. Cl. ........................................ 425/29; 425/32; 425/33; 425/38; 425/47; 425/51
[58] Field of Search ................. 425/29, 32, 33, 35–38, 425/47–51, 54–58

[56] References Cited

U.S. PATENT DOCUMENTS

| | | | |
|---|---|---|---|
| 2,741,799 | 4/1956 | Heston | 425/32 |
| 3,910,735 | 10/1975 | Caretta | 425/47 |
| 4,181,482 | 1/1980 | Grawey et al. | 425/35 |
| 4,580,959 | 4/1986 | Pizzorno et al. | 425/32 |
| 4,653,992 | 3/1987 | Baraldi | 425/17 |
| 4,726,749 | 2/1988 | Katsumata | 425/54 |

Primary Examiner—Bernard Nozick
Attorney, Agent, or Firm—Emrich & Dithmar

[57] ABSTRACT

A split mold type tire curing mold includes a plurality of sectors mounted on the mold base and movable radially inwardly to a closed position wherein the sectors cooperate to form a closed ring for exerting an inwardly directed force on the periphery of a tire during curing of the tire, the outer surface of the ring being generally cylindrical in shape, and a closing ring carried by the mold top includes an annular base portion which is moved into engagement with the sectors as the mold top is lowered during closing of the mold, the annular base portion having movably mounted on the lower peripheral edge thereof a plurality of wedge members, one for each sector, which are positioned to engage the cylindrical outer surfaces of the sectors and are then driven radially inward by the closing ring to drive the sectors to and maintain them at their closed position during the tire curing process.

28 Claims, 12 Drawing Sheets

TIRE CURING MOLD

BACKGROUND OF THE INVENTION

The invention relates to tire curing molds of the split-mold type including a mold base, which can be placed on a tire curing platen of a tire curing press or can be part of a tire curing press, and a mold top which is movable relative to the mold base, in the direction of the mold axis, and which can be affixed to the press upper mold carrier of the tire curing press, or can be part of the press upper mold carrier. In the latter case, the lower mold portion includes a lower sidewall plate for forming the tire sidewall area, and a plurality of radially movable sectors carried on the mold base which, when the mold is closed, cooperate to form a ring the inner surface of which is formed representing the tire tread. The sectors are movable by hydraulic means or the like which is coupled to the sectors. The upper mold part defines an upper sidewall form for forming the other tire side wall. A closing ring, which depends from the upper mold part contains inner conical or planar shaped surfaces which converge inwardly towards the top and which interact with the respective opposing surfaces of the sectors during closing of the mold to drive the sectors to their use position and to maintain the sectors at their use position during curing of the tire.

In principle, it is advantageous to keep the outer diameter of a tire curing mold as small as possible. The smaller the diameter and, thus the bulk of a mold, the less energy is required for the curing process. Also, the size of a tire curing press to be built into the mold is dependent on the outer diameter of the mold. The smaller the outer diameter of the mold, the smaller the tire curing press must be. The outer diameter of a mold is determined mainly by the size of the tire to be built, but also by the mold's construction. If, for example, the drive means for the radial movement of the sectors are located at the bottom of the mold, the outer diameter would be smaller than would be the case where the drive means were located on the radial outside of the sectors.

One known tire curing mold is integrated into a tire curing press. The slide arrangement for the sectors is located below the press platen. This slide arrangement has relatively long bent levers for moving the sectors. Together, these bent levers are moved through axial movement of a festoon. This slide arrangement requires no room extending over the minimum outside diameter of the mold prescribed anyway. However, a space of a relatively large height is required below the mold bladder/cavity, because the known construction is suitable only for a mold built into a press. The closing ring of this known mold has a conical inside surface, the height of which is only slightly less than the height of the sectors. The outer surfaces of the sectors are conical so that the diameter of the ring formed by the sectors increases from top to bottom.

To receive a cured tire, the sectors must be moved outward so far that the mold projections, which form the tire profile, are drawn out of the profile and that the inside diameter of the upper rim of the sector ring is equal to or slightly larger than the outer diameter of the tire.

SUMMARY OF THE INVENTION

It is an object of the present invention to provide an improved tire curing mold.

A further object of the invention is to provide a tire curing mold of the split mold type having the smallest outer diameter possible for a given size tire being molded.

Another object of the invention is to provide a split mold type tire curing mold having a simple but effective mechanism for forming the profile of a tire being molded.

Accordingly, the present invention provides a tire curing mold including a mold base, a mold top, and means for moving the mold top relative to the mold base between first and second positions in a direction axially of the mold, the mold being open when the mold top is at its first position and closed when the mold top is at its second position, the mold base defining a first side wall plate for forming a portion of the side wall area of a tire and the mold top defining a second side wall plate for forming a further portion of the tire side wall area, a plurality of arcuate sector members mounted on the mold base at a first location and movable radially thereof from the first location to a second location whereat said sector members cooperate with one another to form a closed ring defining the tire tread portion on the inner surface of the ring, said sector members having a curved outer surface, the curved outer surfaces of said sector members defining for a ring a cylindrical outer surface extending parallel to the mold axis, when the sector members are at their second location, actutating means operable to drive said sector members to a position intermediate their first and second locations, closing means carried by the mold top, and constructed and arranged to cooperate with said sector members as the mold top is moved to its second position during closing of the mold for driving said sector members from said intermediate location to their second location, said closing means including a generally annular base portion extending around an inner peripheral edge of the mold top, and extending outwardly from the mold top with an inner surface for reciprocating movement therealong between first and second positions relative to the mold top, each of said cam means having a bearing surface and a stop surface and, as the mold top is moved toward the mold base, said plurality of cam means moved axially therewith until their stop surfaces engage the mold base, and with continued movement of the mold top toward the mold base, said annular base portion engaging and moving said plurality of cam means radially inward, generally normal to the axis of the mold, whereby their cam surfaces engage said sector members to drive said sector members to their second position, and as the mold top is moved away from the mold base during subsequent opening of the mold, said plurality of cam means being moved radially outwardly, out of engagement with said sector members as said annular base is moved along with the mold top.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF PREFERRED EMBODIMENTS

Figure 1:
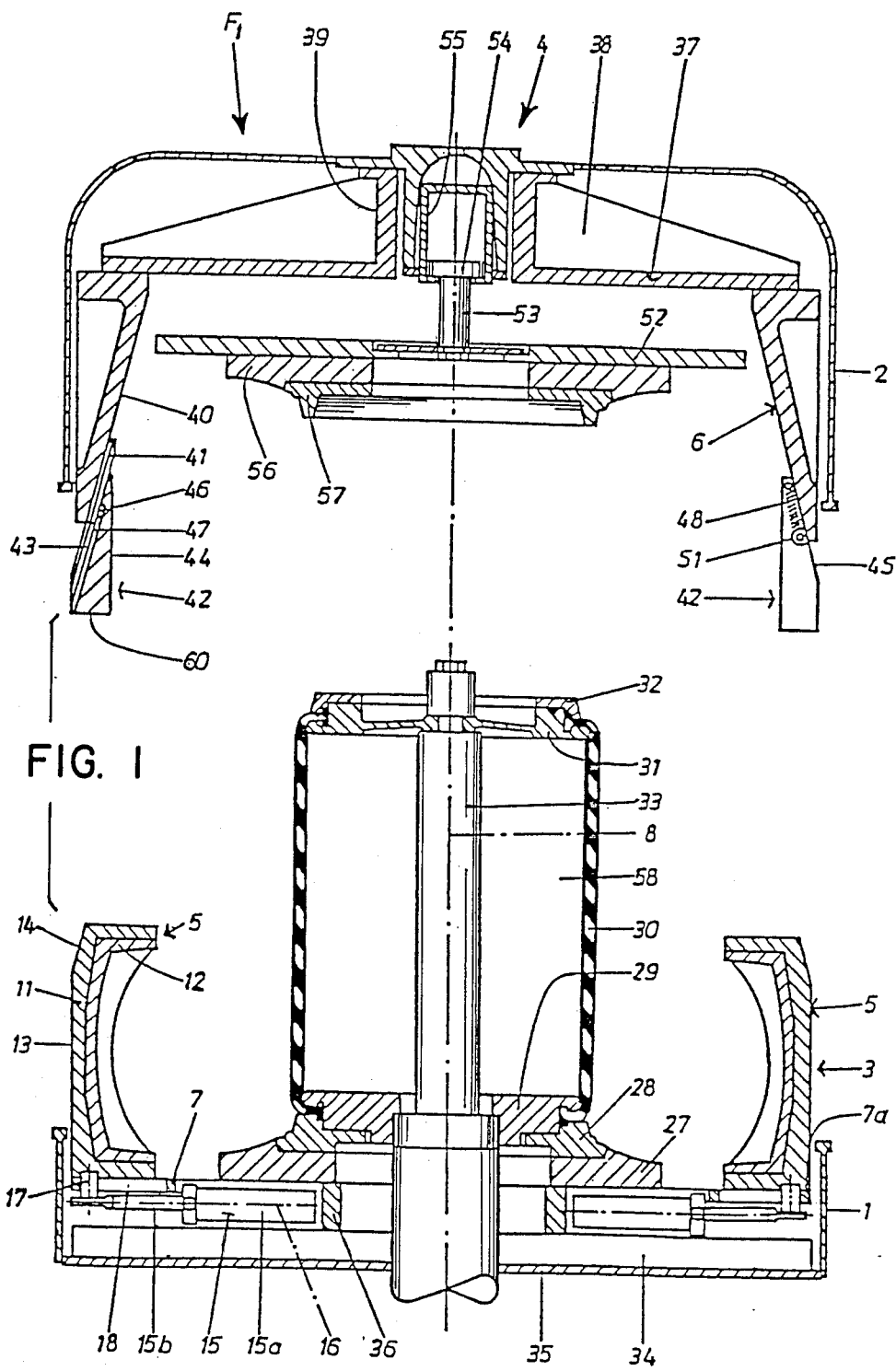
FIG. 1 is a side elevational view in section of the tire curing mold provided by the present invention with heating chamber in the fully open position.

Referring to FIGS. 1-5, the tire curing mold is described with reference to an application to a chamber curing press of the type having enclosing chamber with a bottom 1 and a top 2. The chamber is adapted to contain heated steam for heating the mold for purposes of curing the tire. In accordance with one embodiment, the mold F1 has a mold base 3 and a mold top 4. In order to facilitate the understanding of the construction and operation of the tire curing mold F1, the drawing also depicts parts of the tire curing press, including a clamping plate 29, an inflatable bladder 30, a movable rod 33, a plurality of cross-bars 34, a press base 35, a pressure plate 37, having a plurality of strengthening ribs 38, and a cover plate 52, operated by an actuator including a piston rod 53, a piston 54, and a cylinder 55.

The mold base 3 contains several movable sectors 5. The mold top 4 has a closing ring 6, the purpose of which is to hold together the ring formed by the sectors 5 when the mold is closed.

Figure 5:
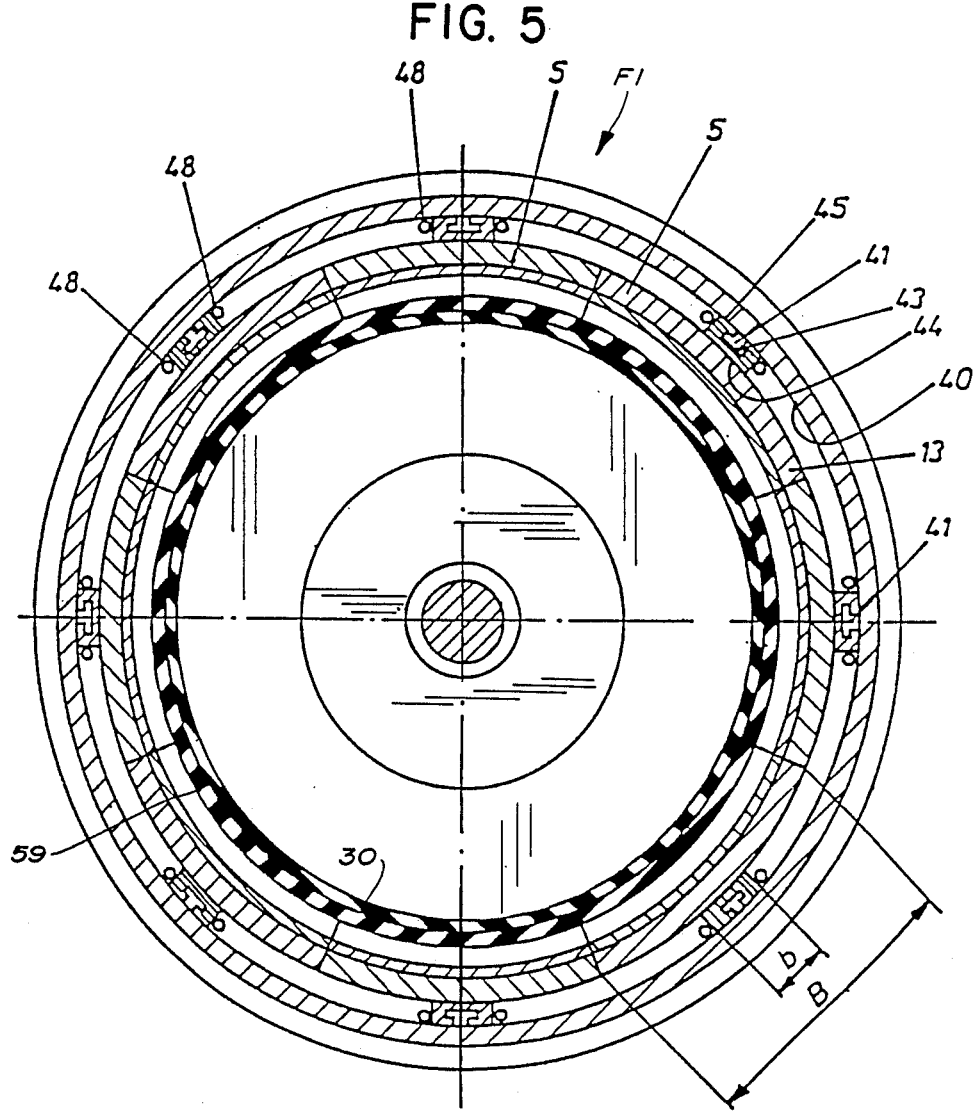
FIG. 5 is a horizontal section taken along the line V—V in FIG. 4.

The mold base 3 has a base plate 7 on which the sectors 5 are radially movable, i.e. along lengthwise radii located at a right angle directed towards and extending through the mold axis 8. As depicted in FIG. 5, in the exemplary embodiment, the mold has a total of eight sectors 5, forming a circle or ring when the mold is in its closed position. However, more or fewer sectors may be used.

Figure 7:
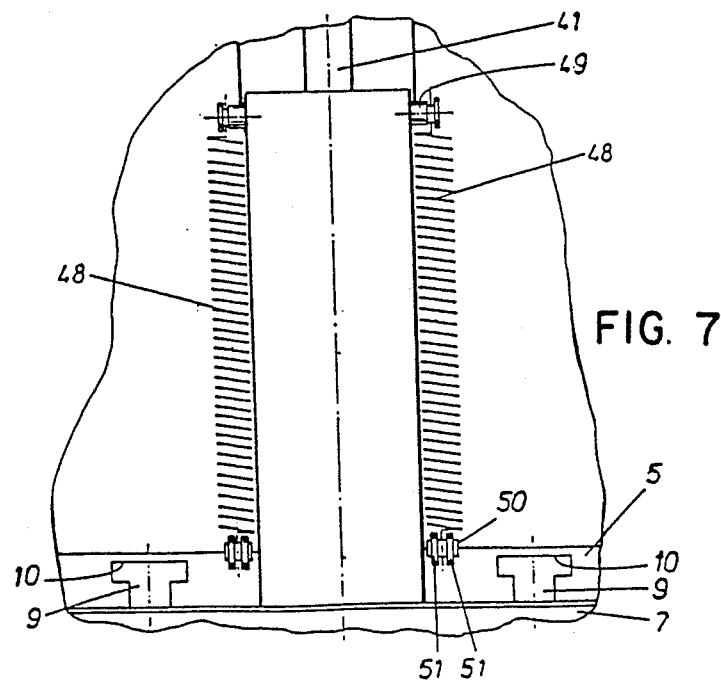
FIG. 7 is an enlarged fragmentary view of the tire curing mold taken along the line VII—VII in FIG. 4.

Referring to FIG. 7, to radially guide the sectors, rails 9 having a T-shaped cross-section are mounted on the base plate 7, which receive and lock to bolts 10 located within the sectors 5. Two rails 9 are provided for the guidance of each sector.

Referring back to FIGS. 1-5, each sector 5 has a body 11, made of steel or the like and which mold segments 12 on its inner surface, made of aluminum, for example, and with protrusions, which define the profile to be molded into the tire under construction. Each sector body 11 has, for the major part of its height, a cylindrical outer surface 13, turning into a conical surface 14 near the sector's upper end. With the mold in a closed position, the cylindrical outer surfaces of all sectors form a continuous cylindrical surface and the conical areas form a continuous conical surface. The conical surface 14 does not weaken the body 11 of the sectors, because due to the torus shape of the inflatable mold cavity/bladder 30, its diameter becomes smaller towards the top.

An hydraulic actuator 15 is provided for each sector 5. The axis 16 of the actuator extends horizontally and radially. The actuator includes a cylinder 15a which is firmly connected to the base plate 7, and a piston rod 15b, extendable from cylinder 15a, which is connected to a sleeve 17 which is firmly attached to its respective sector body 11 and which extends through a radial slot 18 in the base plate 7. The actuators 15 are located in a passage within the base plate 7. The base plate 7 has a ring-shaped area 36 in its middle.

Figure 8:
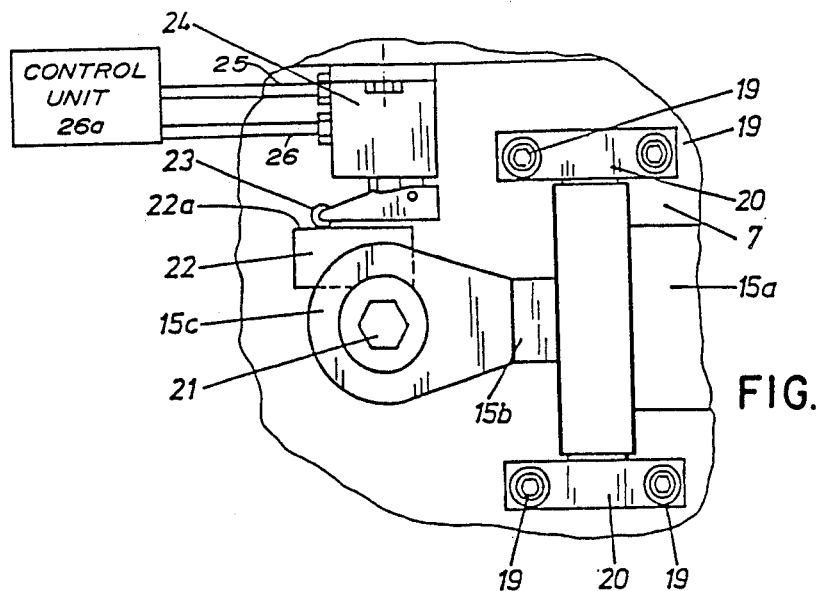
FIG. 8 is an enlarged fragmentary view taken in direction of arrows VIII in FIG. 4.

Referring to FIG. 8, the cylinder 15a is affixed to the base plate 7 by screws 19 which are received in tapped holes in the base plate and by brackets 20. To connect the piston rod 15b to the sector 5, a screw 21 is provided which extends through the sleeve 17 (FIG. 1) and fits into a groove on the sector's body 11. For each actuator, a cam 22 is affixed to the end 15c of the piston rod 15b, interacting with a cam follower roller 23 of a limit switch 24. Hoses 25 and 26 originate from the limit switch 24, which, due to the high temperatures, preferably are water or air hoses. The hoses 25 and 26 extend to a control unit 26a which responds to actuation of the limit switches, and effects the closure of the press only when all piston rods 15b are retracted so far that the cam follower roller 23 rests on the control surface 22a of the cam 22, indicative of the sectors 5 being moved inwardly radially sufficiently to allow the wedges 42 to move downwardly to engage plate 7 without striking the sectors.

Referring to FIGS. 1-5, a plate 27 located on the mold base 3 molds part of the lower side wall of a tire under construction. A ring 28 is connected to the plate 27 to form the bead of the tire to be produced. The ring 28 interacts with a clamping plate 29 which serves to clamp the lower rim of an inflatable bladder 30, the upper rim of which is held between a clamping plate 31, carried on a vertically movable shaft 33.

Radially extending cross-bars 34 are firmly connected to a press base 35. Four strengthing bars, placed at 90° spacings each of each other, have T-shaped slots into which nuts (not shown) are locked for fastening of the mold to the bottom.

The mold top 4 is attached to a pressure plate 37, strengthened by radial ribs 38, extending from the periphery of the pressure plate 37 to a centrally located hub 39. The closing ring 6 of the mold top 4 is affixed to the press plate 37. The closing ring 6 has an annular base portion with a hollow-tapered inner surface 40. Evenly distributed over the circumference of the hollow-tapered surface 40 are a total of eight rails 41 of T-shaped cross-cut. The placement of these rails 41 is depicted in FIG. 5. Each rail 41 serves to guide a different one of the closing wedges 42. To this end, each closing wedge has a guide groove 43 (see FIG. 5), also of T-shaped cross-section for locking into the rail 41. In this manner, the closing wedges 42 can be guided along-side the directrix of the hollow-tapered surface 40 without the risk of the closing wedges lifting off of the surface 40.

Each closing wedge 42 has a bearing surface 44 on its inner surface, matched in shape to the cylindrical outer surface 13 of the corresponding sector 5. Each outside 43 of each closing wedge, defines a bearing surface 45, proportioned to correspond in shape and angle of slant to the hollow-tapered surface 40. The interaction between surfaces 40 and 45 as well as between surfaces 44 and 13 is depicted in FIG. 5.

The downward movement of each closing wedge 42 is limited by a stop 46, interlocking in a stop groove 47 in the closing wedge 42. When the upper end of the stop groove 47 engages the stop 46, no further downward movement of the closing wedge is possible.

Each of the closing wedges 42 is biased by tension springs 48 (see FIG. 5) downwardly to a position where it is extended relative to the annular base portion of the ring 6. A spring 48 is provided for each side of each closing wedge, as depicted in FIG. 5. The upper end of each tension spring 48 is suspended from a pivot pin 50, passing through apertured fins 51, firmly connected with the closing ring 6. The tension springs 48 are pre-stressed in such a manner that they will try to contract themselves. They thus aid the effect of gravity in causing the closing wedges 42 to move downward relative to the closing ring 6.

Figure 2:
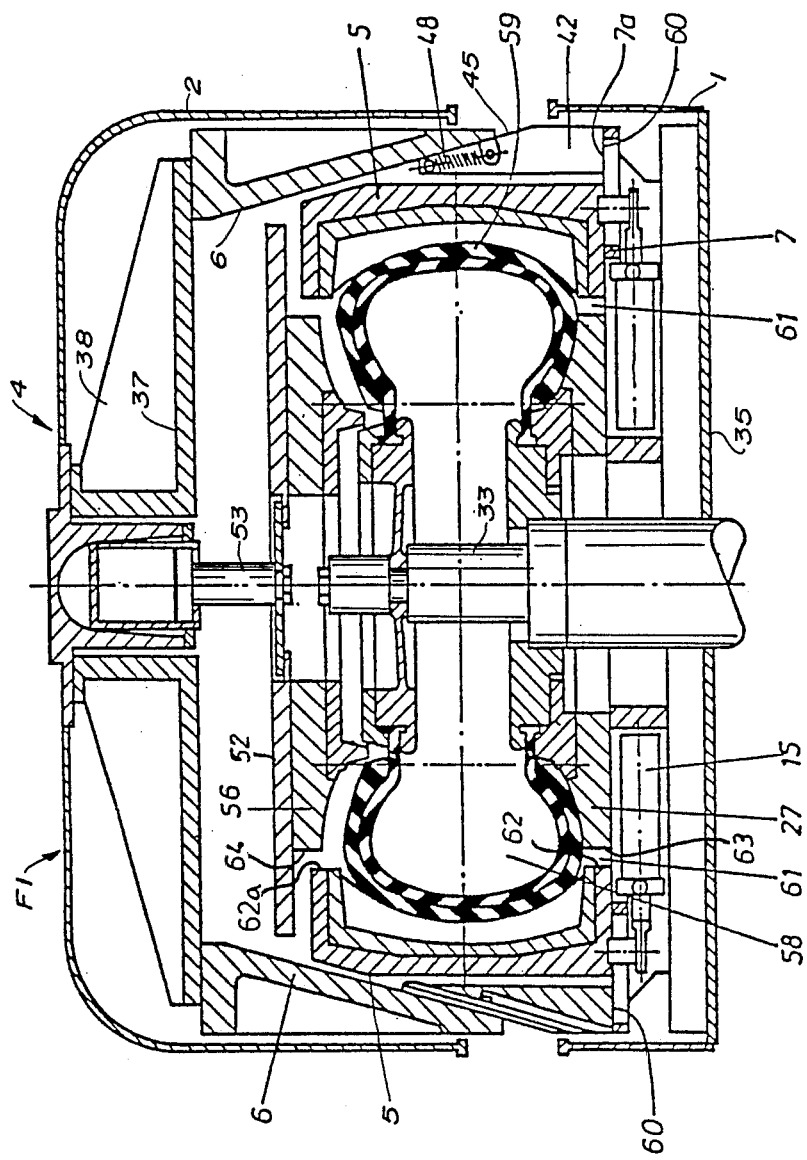
FIG. 2 is side sectional view through the mold during a closing phase, with the sectors moved inward and the closing ring partially lowered.
Figure 3:
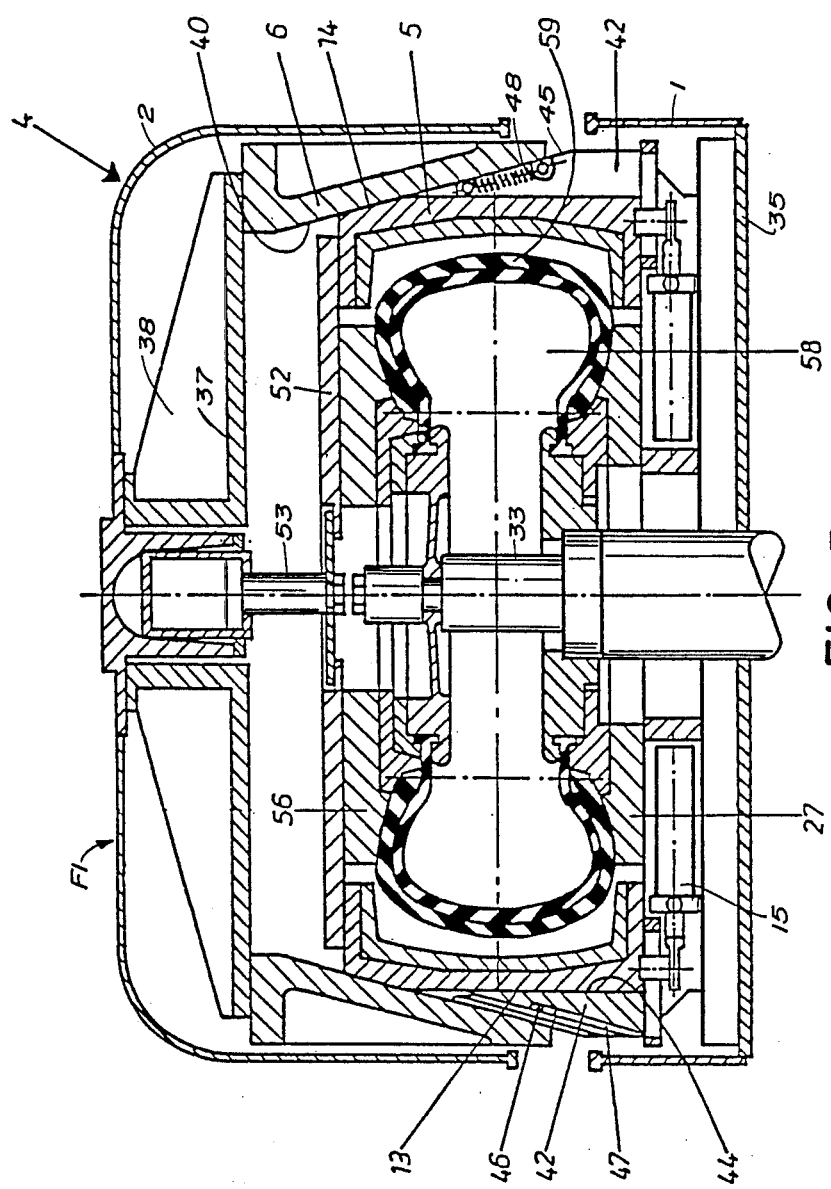
FIG. 3 is a side sectional view of the mold during the pre-expanding phase, with the sidewalls of the tire forming mold parts at their final axial distance from each other.
Figure 4:
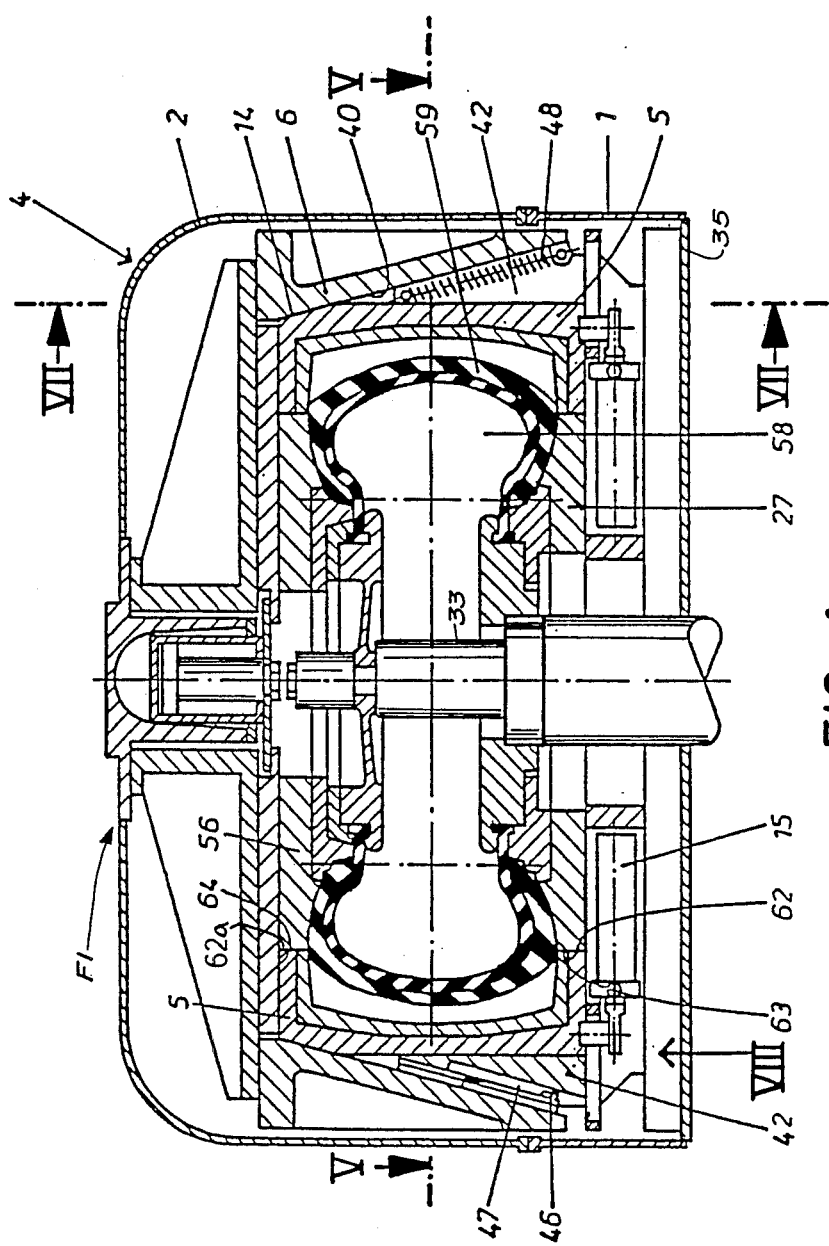
FIG. 4 is a side sectional view of the mold in the fully closed position.

Referring to FIGS. 1-6, each closing wedge 42 has a lower slide surface 60, which, after the sectors 5 have been retracted far enough and the mold top is lowered to the position shown in FIGS. 2-4, engages the surface 7a of the base plate 7. The surface 7a of the base plate 7 thus forms bearing surfaces, with which the slide surface 60 can interact as the wedges 42 are driven radially inward (FIGS. 3 and 4) by the ring 6.

The mold top 4 also includes a cover plate 52, which is suspended from a piston rod 53. The piston rod 53 is located on a piston 54, which is movable within a cylinder 55 axially of the mold.

A plate 56 is attached to the cover plate 52. Plate 56 corresponds to plate 27 of the mold base 3 for molding part of the upper sidewall of a tire under construction. A ring 57 connected to plate 56 forms the upper bead area of a tire to be manufactured.

Operation of the tire curing mold is described in the following, with reference to FIGS. 1-5.

When operating the tire curing mold, the mold base 3 is placed on the tire curing press platen and the mold top 4 is connected to the press upper mold carrier. In this fashion, the mold top can be moved relative to the mold base. The press platen incorporates means (not shown) for vertical movement of the rod 33.

Prior to placing a green tire into the mold, the mold components have the position depicted in FIG. 1, the open position for the mold. Here, the sectors 5 are moved radially outward and the inflatable bladder 30 is stretched. The closing wedges 42 are at their lowest or fully extended position relative to the closing ring 6, defined by locking with the stops 46 at the ends of stop grooves 47.

Firstly, the green tire is placed over the inflatable bladder 30. Then the rod 33 is moved downward, collapsing the bladder 30 into the tire and at the same time, the mold starts closing. In doing so, the sectors are moved radially inward by the admission of fluids to the cylinders 15. The green tire initially rests on the protrusions (27,28) that are to form the profile. Once all sectors 5 have been driven inward far enough as determined by operation of the limit switches 24, the lowering of the mold top 4 is initiated. Limit switches 24 monitor whether the sectors are moved in far enough (see FIG. 8). The sectors 5 must be moved inward so far that, while lowering the mold top 4, the closing wedges 42 will not come to rest on the tops of the sectors 5.

FIG. 2 depicts a positioning in which the lower slide surfaces 60 of the closing wedges 42 have lowered themselves onto the surface 7a of the base plate 7. A radial shift of the closing wedges 42 relative to the closing ring 6, however, has not yet occurred. The sectors 5 have not yet moved in to make contact with plates 27 and 56. The pressure cylinders 15 do not exert a pressure large enough to overcome the inflated pressure in the cavity 58 of the bladder 30 to move the sectors 5 completely inward. Thus, gaps 61 are likely to exist at this time between end surfaces 62 and 62a of the sectors, at their bottom and top respectively, and the peripheral edges 63 and 64 of plates 27 and 56, respectively.

FIG. 3 depicts a further step of the closing process. The mold top 4 has been lowered so far that the hollow-tapered surface 40 of the closing ring 6 has come into contact with the sectors 5 at the upper conical surfaces 14 of the sectors 5. The closing wedges 42 already have been moved radially inward partways by closing ring 6, made evident also by the stop groove 47 having been shifted upward relative to the stop 46. The bearing surfaces 44 of the closing wedges have engaged the sector outer surfaces 13. Furthermore, the cover plate 52 now rests on top of the sectors 5, so that the plates 27 and 56 have reached their minimum axial separation from each other. When the mold top is positioned as shown in FIG. 3, a so-called pre-extending takes place, in the course of which relatively high pressure is induced into the bladder 30 and the green tire 59 is further molded to its final shape.

FIG. 4 shows the mold in the fully closed position. The mold top 4 now has moved down so far that the chamber top 2 has descended onto the chamber base 1, the peripheral edges 1a and 2a thereof being provided with complementary sealing means to form between a seal the chamber top and bottom as is known in the art. The closing ring 6 has shifted further downward alongside the surfaces 14, so that its hollow-tapered surface 40 coacts with the closure opposing surfaces 45 of the closing wedges 42, driving the wedges radially inward. In the course of the closing process, the sectors 5 are held over almost their entire height, i.e. over approximately two-thirds of their height, by the closing wedges 42 the surfaces 44 of which engage surfaces 13, and at their remaining upper portion by the closing ring 6 directly the upper part of the surface 40 of which engages surfaces 14. Since the tire curing press is capable of putting out a large pressure which is directed radially outward tending to drive the sectors outward, a correspondingly large radial pressure is exerted inwardly on the sectors 5 by the closing ring and wedges, forcing the sectors inward into their final position, at which point their end surfaces 62 at the bottom engage the peripheral edge 63 of plate 27, and end surfaces 62a at the top engage the peripheral edge 64 of plate 56. During the closing phase, the tension springs 48 are tensioned as can be easily seen by comparing FIGS. 2 and 4.

The green tire 59 is now expanded to its final shape by inducing high pressure hot water or another medium into the curing bladder cavity 58. In doing so, the green tire 59 is expanded to such a degree that the protrusions on the inner surfaces of the sectors 5 are completely pressed into the uncured tire. After a certain time of heating, the curing process is completed.

Prior to opening the mold, the bladder cavity 58 is depressurized. Assisted by the press, the mold top 4 is lifted, at which time the closing ring 6 is released from the sectors 5. When the stops 46 reach the upper ends of the stop grooves 47, the closing wedges 42 are lifted. The downward movement of the closing wedges 42 relative to the closing ring 6 is caused both by the gravity weight of the closing wedges 42 and by the tension springs 48 trying to contract. Once the closing ring 6 has been lifted to the position shown in FIG. 2, the pressure cylinders 15 are actuated to drive the sectors 5 radially outward, providing a large access opening to the inside of the mold through which the cured tire can be removed.

The mold 4 presents a relatively small diameter because the sectors 5 have an approximately even wall thickness over their entire height, so that, when the mold is at the required maximum opening (depicted in FIG. 1) all sectors remain within a circumfering cylinder of a relatively small diameter. Also, the sectors are moved inwardly during closing of the mold, and the driving wedges, which drive the sectors to their final position (FIG. 4), are moved into the space created as the sectors are moved radially inward.

Figure 6:
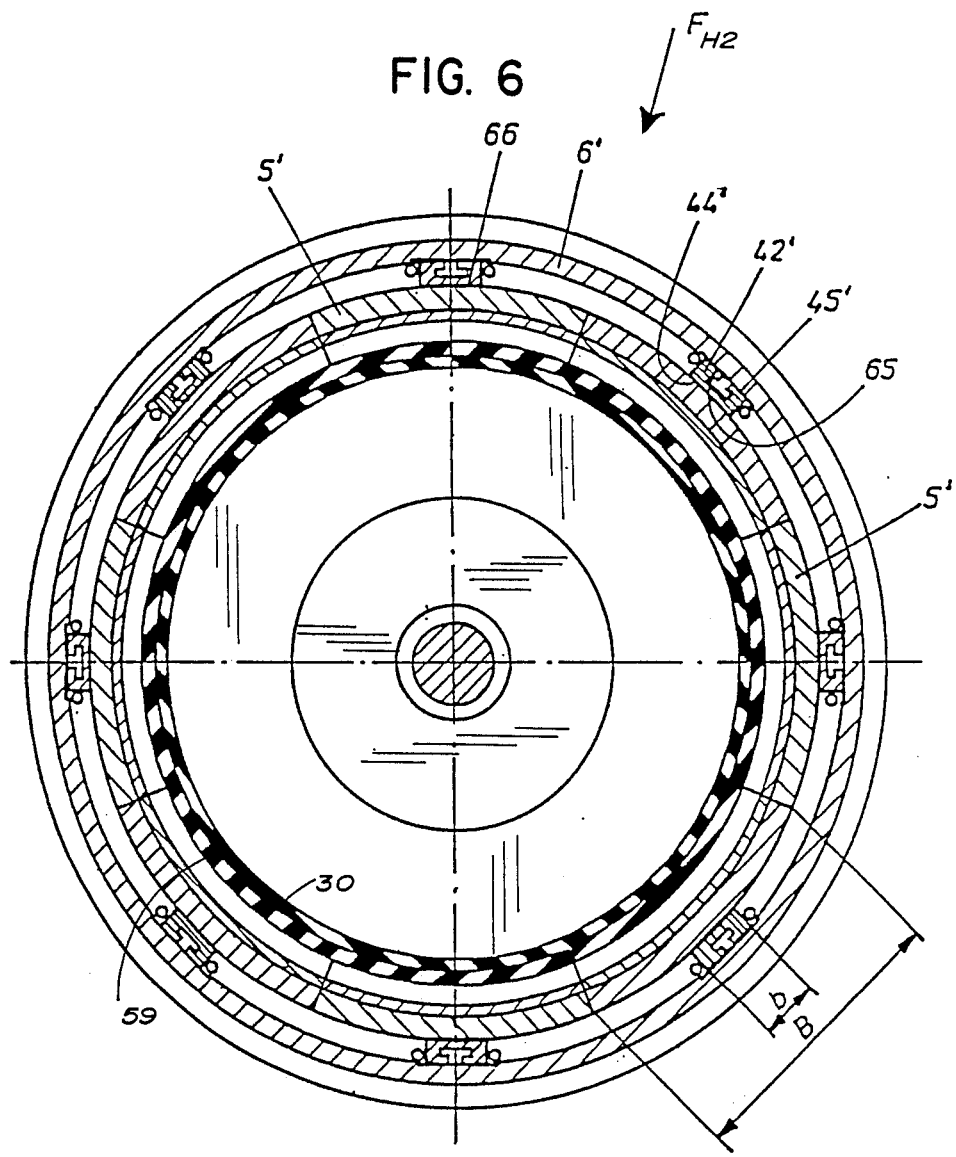
FIG. 6 is a horizontal section of an alternative embodiment of the tire curing mold of the invention in which the closing wedges have planar closing surfaces.

Referring to FIG. 6, there is shown a further embodiment for the tire curing mold F2 which differs only slightly from the tire curing mold F1 shown in FIGS. 1-5. The closing wedges 42' have planar action or bearing surfaces, i.e. planar surface 44' and an opposing planar surface 45'. Correspondingly, planar surfaces are provided at the closing ring and at the sectors in the area of the closing wedges 42', i.e. planar surfaces 65 at the closing ring 6' and opposing planar surfaces 66 at the sectors 5'. Other than this, tire curing mold F2 functions the same as tire curing mold F1 shown in FIGS. 1-5. In both cases, the closing wedges 42 and 42' have a width "b" which is smaller than the width "B" of the sectors 5 and 5'.

Figure 9:
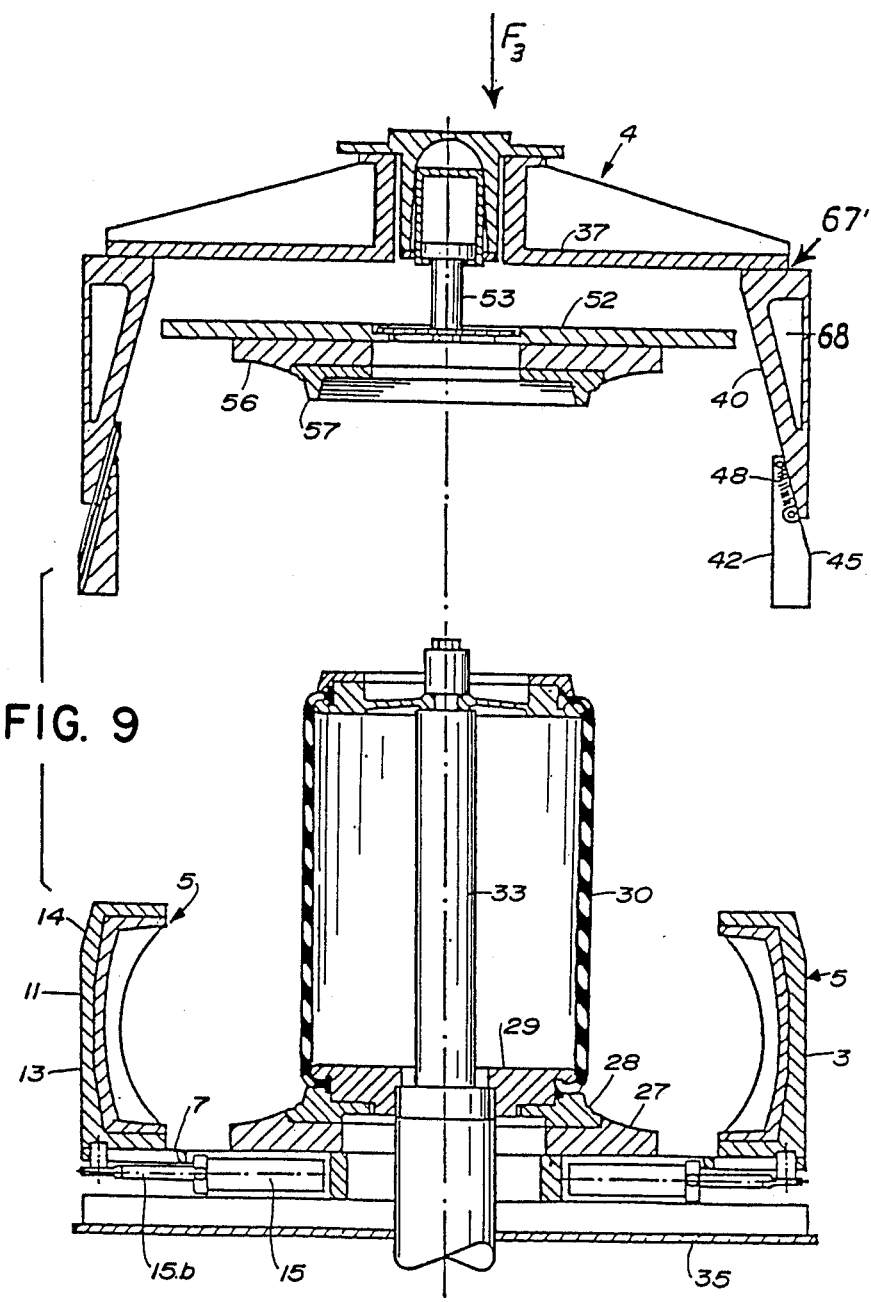
FIG. 9 is a side elevational view, in section, of a self-heating tire curing mold provided by the invention.
Figure 10:
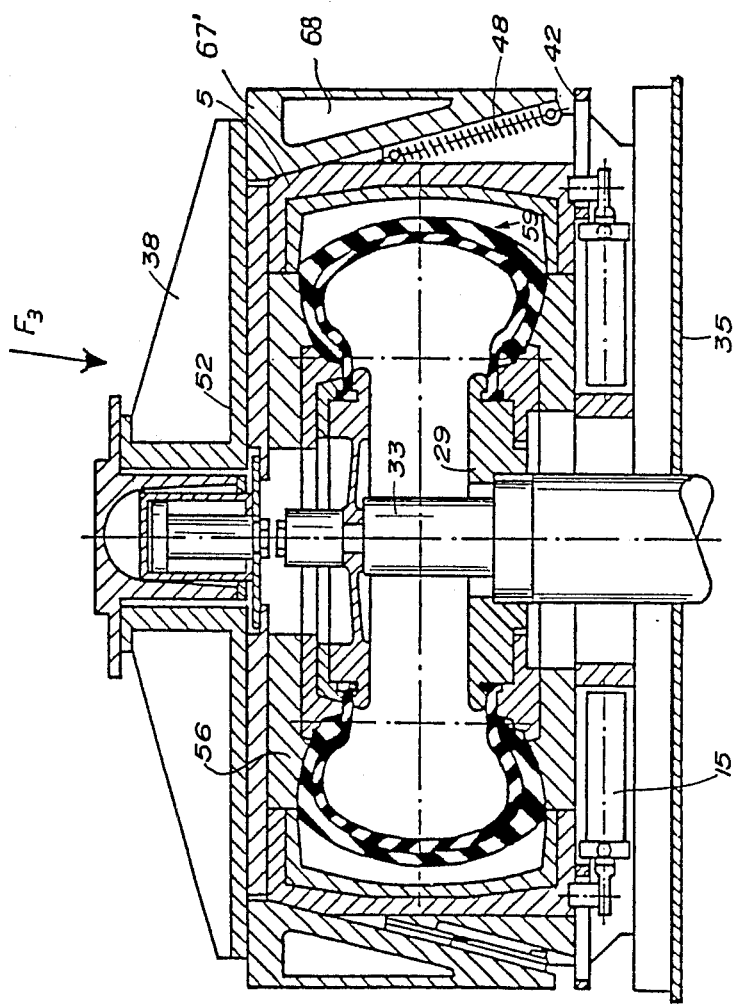
FIG. 10 is a cross-sectional view of the tire curing mold of FIG. 9 shown in the closed position.
Figure 11:
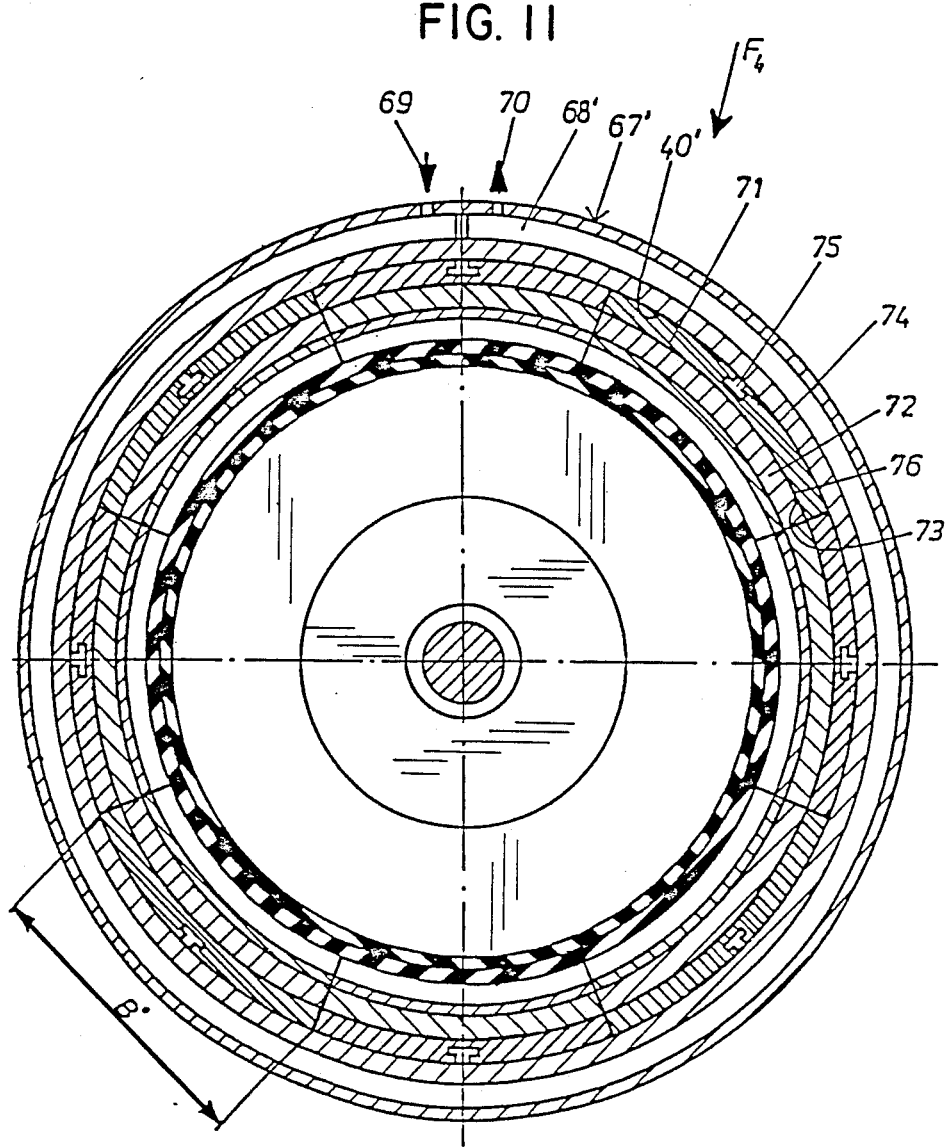
FIG. 11 is a horizontal cross-sectional view of a further embodiment of a self-heating tire curing mold of the invention which is provided wide closing wedges which correspond in arcuate width to the width of the sectors.

FIGS. 9-11 illustrate that the principles of the invention can be applied to self-heating tire molds F3 and F4. For such molds, the closing ring 67' has a cavity 68 (FIG. 10) through which a heating medium, such as steam or hot water, is introduced. Inlets and outlets are represented in FIG. 11 by arrows 69 and 70. The closed position of mold F3 is depicted in FIG. 10. Enclosure of the mold by a chamber is not intended here because the heat is applied via the closing ring 67'. Further explanation of the mold F3 is not required because construction and operation other than the differences above, are the same as for the tire curing mold F1, shown in FIGS. 1-5.

FIG. 11 depicts a horizontal sectional view of a tire curing mold 4, which has closing wedges 71 of an arcuate width substantially equal to that of the sectors 72. The closing wedges 71 have a cylindrical inner surface 73, which interacts with the cylindrical outer surface 76 of the corresponding sector, and a conical surface 74. The closing wedges 71 are guided by T-shaped rails along the closing ring 67', as described earlier. Because of the large width B' of the closing wedges 71, there is no room for tension springs. Nevertheless, the mold is functionable since, based on their high specific weight, the closing wedges 71 rarely reach their lower final position relative to the closing ring 67'.

Figure 12:
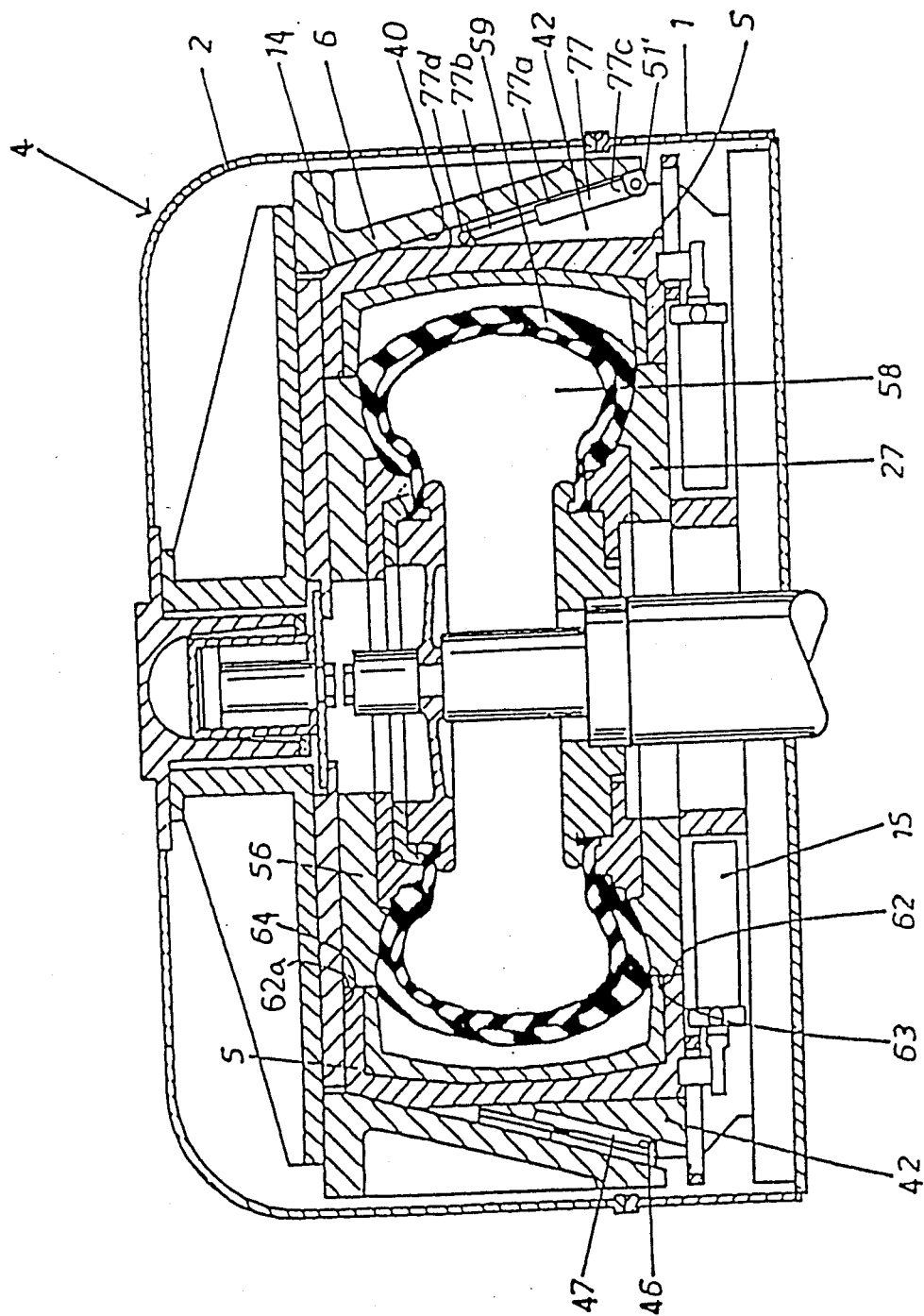
FIG. 12 is a side sectional view similar to FIG. 4, of a further embodiment of the tire curing mold shown in its fully closed position, but differing in that instead of springs, fluid actuated cylinders operate the closing wedges.

FIG. 12 is a side sectional view of an alternative embodiment of the curing mold with the mold fully closed, as in FIG. 4, however with the difference that instead of springs 48, piston rods 77b of cylinders 77 are affixed to both sides of the closing wedges 42. As seen in FIG. 12, one of these cylinders 77, which may be actuated with air pressure, water pressure or oil and which includes a cylinder element 77a and a piston rod 77b, is affixed to the closing wedges 42. Here one end 77c of the cylinder element 77a is connected to a tongue 51', which in turn is connected to a closing ring 6, and one end 77d of the piston rod 77b is connected to the closing wedges 42 upper end. When the closing ring 6 is moved downward along the closing surface 40 of the closing wedge 42, the piston rod 77b is extended or, with opposite movement of the closing ring 6 upward, is retracted correspondingly. This construction allows enlargement of the gap 61 between plate 27 for one and the sector element 11 as well as the mold segment 12 by retracting the closing wedges 42 with the mold in the open position. Further explanation is not required since the remaining elements correspond in construction and function to curing mold F1 in FIG. 4.

Figure 13:
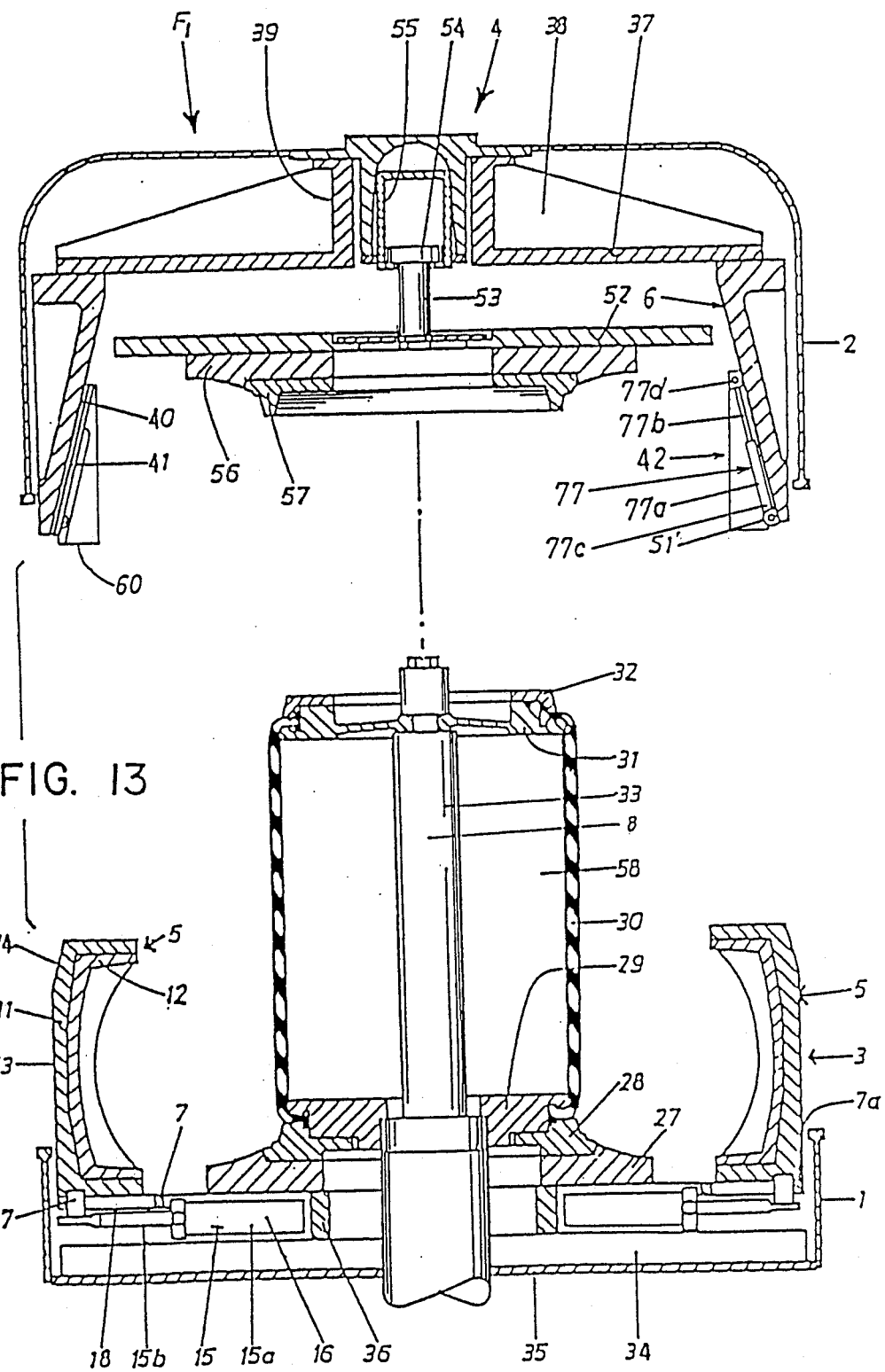
FIG. 13 depicts a side sectional view of a tire curing mold with heating chamber similar to that for the embodiment shown in FIG. 1, but differing in that fluid actuated cylinders operate the closing wedges.

FIG. 13 is a side sectional view corresponding to curing mold F1 depicted in FIG. 1 with heating chamber and in the fully open position, however with the difference that instead of springs 48, cylinders 77 are employed on both sides of the closing wedges 42. Since the cylinders 77 were described previously, further explanation is not required.

Thus, in summary, the present invention provides a tire curing mold characterised by an outer diameter which is as small as possible for a given size mold cavity. The tire mold includes a plurality of sectors having concentric cylindrical inner surfaces which are moved into engagement with outer surface of the tire on which tread is formed for counteracting the radial pressure exerted on the inner surface of the tire during curing, the sectors being partially driven toward the tire under the force of an hydraulic drive means and being driven to their final position into engagement with the tire by closing wedges which depend from a closing ring and include portions which slidingly move along opposing outer surfaces of the sectors. The interacting surfaces of the wedges and sectors are aligned with one another during closing of the mold. In accordance with one aspect of the invention, the sectors of the mold do not increase in diameter from top to bottom as is the case with known tire molds. Rather, outer surfaces of the sectors of the mold define a generally cylindrical surface. Thus, an imaginary cylinder surrounding the outer areas of the sectors when in their extreme radial position is considerably smaller than for conventional molds of comparable size wherein the sectors increase in size from top to bottom. Thus, the overall diameter of the mold is reduced. This permits use of a smaller tire curing press for a given tire size to be produced than has been hitherto possible.

In accordance with a feature of the invention, stops are provided for limiting the downward travel of the sector closing wedges relative to the closing surfaces. This facilitates achieving a desired position of the closing wedges with the mold in the open position. The closing wedges can reach their lowest position under the force of gravity alone, but a particularly high functional safety is achieved through the use of tension springs which supplement the movement of the closing wedges, biasing the wedges to their final or at rest position. The springs are located on either side of the closing wedges in spaces between adjacent wedges such that the outer diameter of the mold is not increased due to the need to provide space for locating the tension springs outside of the plane of the wedges.

The interacting bearing surfaces on the closing wedges and the closing ring and sector may be planar surfaces providing for a low area superficial pressure and a defined engagement of the surfaces during the closing process. However, the surfaces may also be of conical shape, the surfaces engaging one another only when the mold is in the closed position. In such case, the interacting surfaces are surfaces of revolution which are easily manufactured.

In one embodiment, the closing wedges are relatively narrow members affording spaces between adjacent members for locating the tensioning springs which bias the wedges to their at rest position. In another embodiment, the closing wedges may be approximately the same width as the sectors. Although in this embodiment, insufficient space is provided for locating the restoring springs alongside, or between adjacent, wedges, the closing wedges are of sufficient weight that they are normally maintained at their full extent of travel or rest position under the force of gravity.

In accordance with a further construction of the invention fluid actuated cylinders are provided for operating the closing wedges, resulting in increasing in the size of the gaps between the plates for one and the sector elements as well as the mold segments on the other hand by retraction of the closing wedges with the mold in the open position.

In order to precisely guide the closing wedges, guide rails are provided, preferably with a T-shaped cross-section. However, other cross-sectional shapes are, such as dove-tail, cross-cut, or the locking into a slot of corresponding dove-tail cross-cuts, may be employed. Also, trunnion guides may be employed with the rail comprising a rod locking into apertures formed in the closing wedges. Similarly, the rails may be located along the closing wedge and the guides may interact with rails located on the closing ring.

Further in accordance with the invention, the slide arrangement has hydraulic drive means in the form of lengthwise extending hydraulic cylinders. Such slide arrangement, extending generally normal to the axis of the mold requires very little vertical height such that the overall height of the mold is only slightly enlarged through the inclusion of such drive arrangement. Further, although the tire mold according to the present invention is described as being integrated into the press, the tire mold need not be integrated into the press but may be a stand-alone unit. The low overall height of the drive arrangement allows for its use in an exchangeable tire mold, which, if necessary may be positioned in a press and fully assembled in a mold manufacturing plant.

Further, a control arrangement is provided for control of the positioning of the sectors in order to prevent the closing wedges from engaging the top of the sectors from above as the mold top is lowered during closing of the mold. Such control arrangement, is in accordance with one embodiment, includes limit switches or the like which sense movement of the drive rods of the actuating mechanism which moves the sectors radially inwardly and outwardly.

On the upper end of each sector, there is provided a short conical or wedge shaped section or surface for directing interaction with complementary surfaces of the closing ring. This arrangement obviates the need for necessitate enlargement of the diameter of the mold because the shape of the sectors conforms to that of the tire mold, assuring that the overall diameter required for the sectors is maintained at a minimum regardless in spite of the provision of a slanting surface portion thereon.

The principles of the present invention apply to tire curing molds for use in a chamber curing press as well as in the so-called self-heating tire curing mold.

I claim:

1. In a tire curing mold including a mold base, a mold top, and means for moving the mold top relative to the mold base between first and second positions in a direction axially of the mold, the mold being open when the mold top is at its first position and closed when the mold top is at its second position, the mold base defining a first side wall plate for forming a portion of the side wall area of a tire and the mold top defining a second side wall plate for forming a further portion of the tire side wall area, the improvement comprising:

a plurality of arcuate sector members mounted on the mold base at a first location and movable radially thereof from the first location to a second location whereat said sector members form a closed ring defining the tire tread portion on the inner surface of the ring, said sector members having a curved outer surface, the curved outer surfaces of said sector members defining for the ring a cylindrical outer surface extending parallel to the mold axis when the sector members are at their second location, actuating means operable to drive said sector members to a position intermediate their first and second locations, closing means carried by the mold top and constructed and arranged to engage said sector members as the mold top is moved to its second position during closing of the mold for driving said sector members from said intermediate location to their second location, said closing means including a generally annular base portion extending around an inner peripheral edge of the mold top, and extending outwardly from the mold top with an inner surface inclined outwardly in a direction away from the mold top, and a plurality of wedge means on said inclined surface for reciprocating movement therealong between first and second positions relative to the mold top, each of said wedge means having a bearing surface and a stop surface, and, as the mold top is moved toward the mold base, said plurality of wedge means being moved axially therewith until their stop surfaces engage the mold base, and with continued movement of the mold top toward the mold base, said annular base portion engaging and moving said plurality of wedge means radially inward, generally normal to the axis of the mold, whereby their bearing surfaces engage said sector members to drive said sector members to their second position, and as the mold top is moved away from the mold base during subsequent opening of the mold, said plurality of wedge means being moved radially outwardly, out of engagement with said sector members as said annular base is moved along with the mold top.

2. A tire curing mold according to claim 1, wherein said actuating means is located beneath said sector members and includes an actuating element shaft and includes a drive element extending normal to the axis of the mold, and means coupling said actuating element to said sector members.

3. A tire curing mold according to claim 1, wherein said closing means includes a plurality of cylinder means each including a cylinder element and a piston rod and said wedge means includes a plurality of closing wedges, and wherein said piston rods of the cylinder means are connected to the upper ends of the closing wedges to move the closing wedges along said inclined surfaces in a downward or upward direction.

4. A tire curing mold according to claim 3, wherein first and second cylinder means each having a cylinder element and piston rod are provided on first and second sides of each closing wedge, each cylinder means having one end of its piston rod connected to the upper end of the associated closing wedge and one end of its cylinder element connected to said closing ring near the bottom thereof.

5. A tire curing mold according to claim 1, wherein said closing means further includes bias means coupled to said plurality of wedge means and urging said plurality of wedge means toward said first position, said wedge means being moved radially inward against the force of said bias means during closing of the mold and being moved radially outward under the force of said bias means during opening of the mold.

6. A tire curing mold according to claim 5, wherein said wedge means comprises a plurality of wedge members corresponding in number to said sector members, said bias means comprises a plurality of bias elements each associated with a different one of said wedge members, each bias element located between an adjacent pair of said wedge members.

7. A tire curing mold according to claim 6, wherein said wedge members are aligned vertically axially with said sector members when the sector members are at their first position, said sector members being driven towards their second position by said actuator means providing a channel between the curved outer surface of said sector members and an inner surface of the mold bottom, and said cam members being moved into the channel as the mold top is moved to its second position.

8. A tire curing mold according to claim 6, further comprising means for preventing the movement of the mold top relative to the mold bottom when the sector members are at their first position.

9. A tire curing mold according to claim 6, wherein said bias element comprises a spring having a first end connected to said annular base portion and a second end connected to said wedge member.

10. A tire curing mold according to claim 6, wherein said annular base portion of said closing means has its inclined surface directed inwardly toward the axis of the mold, each of said wedge members having an inclined surface engaging said inclined surface of said annular base portion and movable therealong whereby said annular base portion imparts a radial movement to said wedge member following engagement of the stop surface of the wedge member with the mold base.

11. A tire curing mold according to claim 10, wherein said annular base portion defines guide means for each said wedge member along its inclined surface.

12. In a tire curing mold including a mold base, a mold top, and drive means for moving the mold top relative to the mold base between first and second positions in a direction axially of the mold, the mold being open when the mold top is at its first position and closed when the mold is at its second position, the mold base defining a lower side wall plate for forming a portion of the side wall area of a tire and the mold top defining an upper side wall plate for forming a further portion of the tire side wall area, the improvement comprising:

a plurality of arcuate sector members mounted on said base at a first location and movable radially thereof from the first location to a second location whereat said sector members define a closed ring defining the tire tread portion on the inner surface of the ring, said sector members having a curved outer surface, the curved outer surfaces of said sector members defining for the ring a cylindrical outer surface extending parallel to the mold axis when the sector members are at their second location, actuating means for driving said sector members to a position intermediate said first and second locations;

closing means carried by the mold top and depending downwardly therefrom, said closing means constructed and arranged to engage said sector members as the mold top is moved to its second position during closing of the mold for driving said sector members to their second location, said closing means including a generally annular base portion with an inner surface which is inclined outwardly from top to bottom, and plurality of wedge means mounted on said inclined surface for reciprocating movement therealong between first and second positions upwardly and downwardly relative to the mold top, each of said wedge means having a bearing surface and a stop surface, and, as the mold top is lowered relative to the mold base, said plurality of wedge means are carried downward therewith until their stop surfaces engage the mold base, and with continued lowering of the mold top relative to the mold base, said annular base portion engaging and moving said plurality of wedge means radially inward and normal to the mold axis to engage said sector members and drive said sector members to their second position and as the mold top is raised during subsequent opening of the mold, said plurality of wedge means being moved radially outwardly out of engagement with said sector members as said annular base is raised along with the mold top.

13. A tire curing mold according to claim 12, wherein each sector member has a short conical section defined on its upper edge for direct interaction with said annular base portion of said closing means during closing of the mold.

14. A tire curing mold according to claim 12, wherein said mold is surrounded by a chamber for receiving heating steam.

15. A tire curing mold according to claim 12, wherein said closing means defines a cavity for receiving heated fluid.

16. A tire curing mold according to claim 12, wherein said annular base portion of said closing means defines stop means for limiting the downward travel of said wedge means.

17. A tire curing mold according to claim 12, wherein the arcuate length of said wedge members is substantially less than the arcuate length of said sector members.

18. A tire curing mold according to claim 12, wherein the arcuate length of said sectors is approximately the same as the arcuate length of said wedge members.

19. A tire curing mold according to claim 12, wherein said closing means further includes bias means coupled to said plurality of wedge means and urging said plurality of wedge means toward said first position, said wedge means being moved radially inward against the force of said bias means during closing of the mold and radially outward under the force of said bias means during opening of the mold.

20. A tire curing mold according to claim 19, wherein interacting surfaces of said wedge means and said sector members, and interacting surfaces of said annular base portion of said closing means and said wedge means are planar surfaces.

21. A tire curing mold according to claim 19, wherein interacting surfaces of said wedge means and said sector members, and interacting surfaces of said annular base portion of said closing means and said wedge means are segments of a conical surface of a cone the axis of which is coaxial with the axis of the mold.

22. A tire curing mold according to claim 19, wherein said bias means comprises a plurality of spring means coupled between said wedge means and said annular base portion of said closing means for urging said wedge means downward relative to the mold top.

23. A tire curing mold according claim 22, wherein said wedge means comprises a plurality of wedge members spaced apart from one another along the periphery of the annular base portion of said closing means, each of said spring means comprising a tension spring member having one end attached to said wedge member and its other end attached to said annular base portion of said closing means.

24. A tire curing mold according to claim 23, wherein said annular base portion of said closing means defines guide means for said wedge members.

25. A tire curing mold according to claim 24, wherein said guide means comprises guide rails on one of said annular base portion and said wedge members and correspondingly shaped slot defined in the other one of said annular base portion and said wedge members.

26. A tire curing mold according to claim 12, wherein said actuating means comprises fluid actuated cylinder means including an individual cylinder and drive rod for each sector member, the longitudinal axis of each of said cylinder means extending horizontally and radially of the mold base and located beneath said sector members.

27. A tire curing mold according to claim 26, wherein further comprising control means for preventing closure of the mold whenever anyone of said sector members is at its first position.

28. A tire curing mold according to claim 27, wherein said control means comprises a limit switch for each cylinder for providing an output indicative of the position of said drive rod thereof.

* * * * *